United States Patent [19]

Keilholz

[11] Patent Number: 4,847,836
[45] Date of Patent: Jul. 11, 1989

[54] CIRCUIT ARRANGEMENT FOR SYNCHRONIZING THE UNITS IN THE SWITCHING EXCHANGES AND REPEATERS OF A TIME-DIVISION MULTIPLEX TRANSMISSION SYSTEM

[75] Inventor: Heinz Keilholz, Heroldsberg, Fed. Rep. of Germany

[73] Assignee: U.S. Philips Corporation, New York, N.Y.

[21] Appl. No.: 132,382

[22] Filed: Dec. 15, 1987

[30] Foreign Application Priority Data

Dec. 17, 1986 [DE] Fed. Rep. of Germany ....... 3643002

[51] Int. Cl.$^4$ ................................................ H04J 3/06
[52] U.S. Cl. ..................................... 370/100; 375/108
[58] Field of Search ...................... 370/100, 97; 375/4, 375/113, 108; 371/47

[56] References Cited

U.S. PATENT DOCUMENTS

| | | | |
|---|---|---|---|
| 4,147,891 | 4/1979 | Roos | 375/113 |
| 4,606,022 | 8/1986 | Suzuki et al. | 370/100 |
| 4,700,357 | 10/1987 | Ast | 375/4 |

OTHER PUBLICATIONS

P. Grotemeyer et al., "Das Systemgerät PCM 30 F", TE KA DE Technische Mitteilungen (1982), pp. 20–27.

Primary Examiner—Douglas W. Olms
Assistant Examiner—Min Jung
Attorney, Agent, or Firm—Thomas A. Briody; Jack E. Haken; Anne E. Barschall

[57] ABSTRACT

Circuit arrangement for synchronizing the units in the switching exchanges and repeaters of a time-division multiplex transmission system. In time-division multiplex transmission systems a central control device (first unit) is frequently employed to process messages to be transmitted. For a regular mode of operation, the second units provided for the different functions require a plurality of clocks which are phase-synchronized with the clocks of the first unit. For this purpose either a plurality of clock lines between the first unit and the peripherals (second units) are provided or clocks are transmitted through two clock lines at the highest and lowest clock rates and synchronized with the frequency divider arranged in the peripherals (second units) in a master-slave relationship. In order to guarantee phase-coincidence during the frequency division and to include also short-term, non-synchronous conditions, the clock having the lowest clock rate and the clock having the highest clock rate generated by the frequency dividers arranged in the two units combined. The circuit complexible for this combining circuit is low and requires only one exclusive-OR circuits and an OR-circuit for each unit. The circuit arrangement according to the invention is preferably inserted in the device for converting signalling characters of the PCM 30 F time-division multiplex transmission system.

4 Claims, 1 Drawing Sheet

CIRCUIT ARRANGEMENT FOR SYNCHRONIZING THE UNITS IN THE SWITCHING EXCHANGES AND REPEATERS OF A TIME-DIVISION MULTIPLEX TRANSMISSION SYSTEM

BACKGROUND OF THE INVENTION

1. Field of the Invention

The invention relates to a circuit arrangement for synchronizing the units in the switching exchanges and repeaters of a time-division multiplex transmission system. The circuit has a basic clock signal generator G arranged in a first unit. The circuit also has a divider circuit connected to this generator. The circuit also has clock lines for transmiting the clock signals to second units connected to the first unit.

2. Prior Art

In local and regional networks time-division multiplex transmission systems are increasingly used. In the network of the German Federal Post Office a hierarchic, a digital transmission system is used for the transmission of messages. In the lowest order of the hierarchy the transmission system PCM 30 F is used. For the transmission of signalling characters the switching exchanges and repeaters comprise what is commonly referred to as signalling character converting devices.

In addition to its function as a converter, such as for example, taking in or delivering DC signals and producing and reconverting time-division multiplex signals, the signalling character converting device also has the tasks of evaluating and forming switching characters according to the standards of the respective connected switching exchanges, converting different characters for local and trunk traffic or for terminal and through-traffic into standardized character signals to be transmitted on PCM channels, processing the switching characters, for example, signal correction, storage and re-formation of signals etc. The signalling character converting device is divided into a central character converter (first unit) and the respective 30 channel units (second units). The signalling character converting device picks up the switching characters from the speech and signal wires of the selectors, processes them for all 30 telephone channels in the central signalling character converter and bundles them into a time-division multiples signal having a bit rate of 64 kbit/s.

The function of such a signalling character converting device is extensively discussed and explained in an article in "TE KA DE Technische Mitteilungen 1982", pages 20 to 27, entitled "Das Systemgerat PCM 30 F". In section 5.4 "KZU Taktversorgung (TVSK)" is set out that the basic generator arranged in the central signalling character converter, is connected to a divider circuit which supplies all clocks from 2048 KHz to 500 Hz required for the central processing and the PCM 30 F pulse frame formation. The channel-triggering clocks KAT1 ... 30 for triggering the channel units during the right channel periods are formed by mutually combining corresponding portions of these clocks. The different clocks are required in the signalling character converting device as well as in the central signalling character converter and in the channel units to satisfy the requirements as regards switching and transmission technology. The clocks in the central character converter should be in-phase with the clocks in the channel units.

A first solution lies in making all clocks required in the channel units available through a plurality of clock lines from the central signalling character converter. In order to avoid the extensive bundle of clock lines required for this purpose, a second solution consists in passing only the highest and lowest clocks required in the channel unit through separate clock lines, and deriving in the channel units by frequency division the further clocks from the highest clock. However, a problem will occur because frequency divisions effected in the channel units and in the central signalling character converter are not in-phase with respect to each other.

A simple possibility to restore the phase equality consists in a master-slave synchronization of the frequency dividers. This master-slave synchronization is effected every 2 ms according to the 500 Hz frame clock of the identification signal. However, as a result of faults inside the transmission network, pulses can be included which can lead to a shift of the individual channels of the pulse frame in the channel units, so that audible clicking sounds may occur when transmitting speed signals. This will momentarily impair the audibility during the transmission of speech signals, whilst such displacements of bits will lead to errors in the data processing when transmitting data signals in the time-division multiplex transmission system.

Such problems occur in large switching exchanges, in which peripherals having decentralized control arrangements (second units) are controlled from a central control device (first unit).

SUMMARY OF THE INVENTION

The invention has for its object to provide a circuit arrangement for synchronizing the units in the switching exchanges and repeaters of a time-division multiplex transmission system such that, with little switching circuitry, the clocks in the second units are inphase with the clocks in the first unit. This object is achieved according to the invention by a circuit arrangement as set forth in the Field of the Invention, in which the divider circuit comprises a first frequency divider arranged in the first unit and a respective second frequency divider in the second units. The clock signal from the basic clock signal generator and the clock signal at the output of the first frequency divider are applied via the clock lines to a combiner circuit. The combiner circuit is arranged in one of the second units and is connected to the second frequency divider.

The circuit arrangement according to the invention has the advantage that the frequency dividers are in-phase with each other and that only a small number of clock lines are required between the first and second units to guarantee this in-phase condition, and that little additional circuitry is required for the combining circuit. The circuit arrangement according to the invention further has the advantage that a signal can be tapped in the combining circuit, which signal indicates that there is a condition of non-synchronism.

Preferred embodiments of the circuit arrangement are described in the future patent Claims.

BRIEF DESCRIPTION OF THE DRAWING

The invention will now be further described and explained with reference to an embodiment shown in the drawing, in which.

DETAILED DESCRIPTION OF THE PREFERRED EMBODIMENTS

The synchronizing circuit according to the invention is further described and explained hereinafter, for the case in which it is utilized in a converting device for signalling chracters of the timedivision multiplex transmission system PCM 30.

Figure 1:
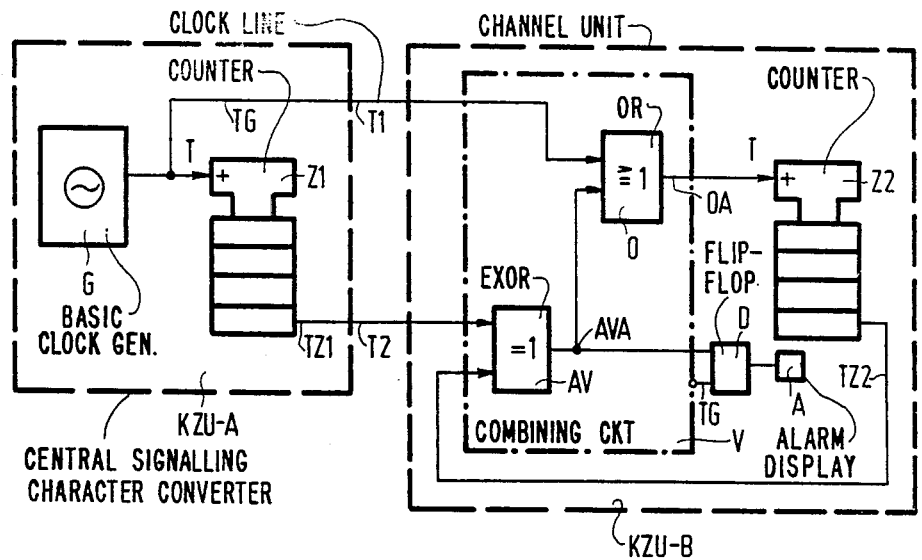
FIG. 1 shows an embodiment of the synchronizing circuit in accordance with the invention and FIG. 2 shows the pulse diagrams of the synchronizing circuit as shown in FIG. 1.

The central signalling character converter KZU-A comprises a basic clock generator G and a first frequency divider Z1. The central character converter KZU-A is connected to channel units KZU-B by means of clock lines T1 and T2. The channel units KZU-B, one of which is represented in FIG. 1, each comprise a combining circuit V and a second frequency divider Z2.

In this respect, counters are preferably used for frequency dividers Z1 and Z2. The combining circuit V comprises an exclusive OR circuit AV and an OR circuit 0.

The clock TG of the basic clock generator G is conveyed to the first counter Z1 as well as to the OR circuit O via the clock line T1. The frequency of the clock TG is situated at 2048 KHz and the first counter divides the clock frequency down to 500 Hz. This clock TZ1 at the output of the last counterstage of the first counter Z1 is applied to a first input of the exclusive-OR circuit AV via the clock linc T2. The second input of the exclusive-OR circuit AV is connected to the last counter stage of the second counter Z2. The clock frequency TZ2 of the last counter stage is also situated at 500 Hz.

The output AVA of the exclusive-OR circuit AV is connected to an input of the OR-circuit O, to whose other input the clock TG from the basic clock generator G is applied via the clock line T1. The output OA of the OR-circuit O is connected to the clock input T of the second counter Z2.

The operation of the combining circuit V will further described and explained with reference to the pulse diagrams shown in FIG. 2. The clocks TG, TZ1 and TZ2 are in-phase until instant $t_1$. At the output AVA of the exclusive-OR circuit AV a signal in the logic-0 condition can be taken off, that is to say, at the output AVA no pulses occur.

Owing to the phase difference between the clock signals TZ1 and TZ2 at the output of the respective first and second frequency dividers Z1 and Z2, the signal at the output AVA of the exclusive-OR circuit AV changes into the logic-1 condition. This signal is used in the alarm display device A, which is connected to the output AVA, to indicate that there is a disturbance, which device is connected to the exclusive-OR circuit AV via a flip-flop D. By means of the flip-flop D needle-shaped interference pulses, which may occur as a consequence of different delay times within the circuit arrangement, are effectively suppressed. This signal also indicates, for example, when the second counter Z2 has broken down.

Figure 2:
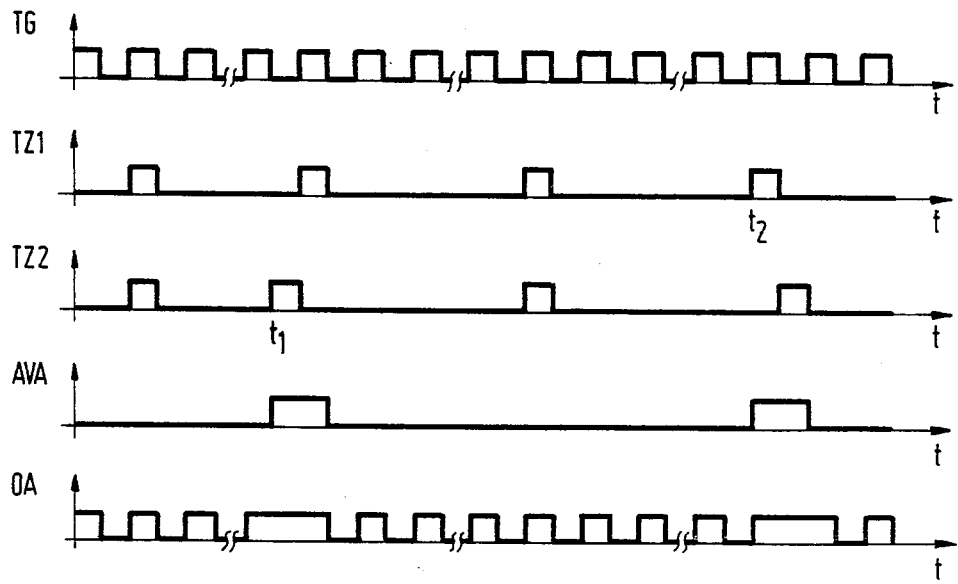

The change in the condition of the signalling character at the output AVA leads to the clock of the counter Z2 which is applied to the clock-pulse input T being retained (compare FIG. 2, instants $t_1$ and $t_2$). This enables detection of non-synchronous conditions in a surprisingly simple manner, and also to guarantee the in-phase condition of the frequency dividers and the counter Z1 and Z2, respectively.

What is claimed is:

1. A circuit for synchronizing a plurality of units which are in switching exchanges and repeaters of a time-division multiplex transmission system, comprising:
   (a) a first unit (KZU-A) including:
      (i) a basic clock signal generator (G) having an output at which a first clock signal is provided;
      (ii) a first frequency divider (Z1) coupled with the output of the basic clock signal generator and having an output at which a second clock signal is provided; and
      (iii) a plurality of clock lines (T1, T2, ...) for transmitting the first and second clock signals; and
   (b) at least one second unit (KZU-B) coupled with the first unit and including:
      (i) a respective second frequency divider (Z2) having an input and an output, at which output a respective third clock signal is provided; and
      (ii) a respective combiner circuit, coupled with the clock lines of the first unit to receive the first and second clock signals
   and having an output coupled with the input of the respective second frequency divider.

2. The circuit of claim 1, wherein
   (a) the first and second frequency dividers comprise respective counters having respective last counter stages coupled with the respective outputs of the counters; and
   (b) each respective combiner circuit comprises:
      (i) a respective exclusive-OR circuit (AV) having:
         (A) a first input coupled via the clock lines of the first unit to receive the second clock signal;
         (B) a second input coupled to receive the respective third clock signal; and
         (C) and output (AVA); and
      (ii) a respective OR circuit (o) having:
         (A) a first input coupled via the clock lines of the first unit to receive the first clock signal;
         (B) a second input coupled with the output of respective exclusive-OR circuit; and
         (C) an output coupled to the input of the respective second frequency divider.

3. The circuit of claim 2 comprising, in each second unit:
   a. a respective flip-flop (D) having an input coupled with the output the respective exclusive-OR circuit and an output; and
   b. a respective alarm display device coupled with the output of the respective flip-flop.

4. The circuit of claim 1 wherein:
   the time-division multiplex transmission system is of the PCM 30 btype;
   the first unit is in a central device for converting signalling characters; and
   each second unit is in a channel unit.

* * * * *